(12) United States Patent
Wood

(10) Patent No.: US 10,305,865 B2
(45) Date of Patent: May 28, 2019

(54) PERMUTATION-BASED CONTENT ENCRYPTION WITH MANIFESTS IN A CONTENT CENTRIC NETWORK

(71) Applicant: CISCO TECHNOLOGY, INC., San Jose, CA (US)

(72) Inventor: Christopher A. Wood, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 15/188,477

(22) Filed: Jun. 21, 2016

(65) Prior Publication Data
US 2017/0366515 A1 Dec. 21, 2017

(51) Int. Cl.
*H04L 29/06* (2006.01)
*H04L 9/06* (2006.01)
(Continued)

(52) U.S. Cl.
CPC .......... *H04L 63/0428* (2013.01); *G06F 7/766* (2013.01); *H04L 9/06* (2013.01);
(Continued)

(58) Field of Classification Search
CPC ..... H04L 63/0428; H04L 9/06; H04L 9/0618; H04L 63/061; H04L 9/18; H04L 9/0861;
(Continued)

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Reaz Ahmed et al, Route: A Name based Routing Scheme for Information Centric Networks, IEEE, 2013.*

(Continued)

*Primary Examiner* — Shanto Abedin

(57) ABSTRACT

One embodiment provides a system that facilitates encryption of manifest content based on permutation. During operation, the system partitions, by a computer system, a collection of data into a first set of content objects, wherein a content object is a chunk comprised of a plurality of bytes. The system performs a first permutation function on the first set of content objects to obtain a first set of permuted content objects. The system creates a manifest based on the permuted content objects, wherein a manifest is a content object which indicates a second set of content objects, wherein a respective content object of the second set is a data object or another manifest. The system encodes the first permutation function and the permuted content objects in the manifest, thereby facilitating an authorized entity that receives the manifest to reassemble the manifest contents based on the permutation function.

20 Claims, 9 Drawing Sheets

(51) Int. Cl.
*G06F 7/76* (2006.01)
*H04L 9/14* (2006.01)

(52) U.S. Cl.
CPC .............. *H04L 9/0618* (2013.01); *H04L 9/14* (2013.01); *H04L 2209/34* (2013.01); *H04L 2209/60* (2013.01); *H04L 2209/64* (2013.01)

(58) Field of Classification Search
CPC ... H04L 61/305; H04L 67/1097; G06F 7/766; G06F 21/6227; H04N 21/4627
USPC ............. 713/165, 167, 187, 168; 380/28, 42
See application file for complete search history.

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |

(56) References Cited

U.S. PATENT DOCUMENTS

| | | |
|---|---|---|
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,253,087 B2 | 2/2016 | Zhang |
| 9,280,610 B2 | 3/2016 | Gruber |
| 9,513,762 B1 * | 12/2016 | Hakim .................. G06F 3/0481 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |

(56) References Cited

U.S. PATENT DOCUMENTS

| | | |
|---|---|---|
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |

(56) References Cited

U.S. PATENT DOCUMENTS

| | | |
|---|---|---|
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0270957 A1* | 9/2015 | Uzun .............. H04L 9/0822 713/168 |
| 2015/0279348 A1 | 10/2015 | Cao |
| 2015/0349961 A1 | 12/2015 | Mosko |
| 2015/0372903 A1 | 12/2015 | Hui |
| 2015/0381546 A1 | 12/2015 | Mahadevan |
| 2016/0021170 A1* | 1/2016 | Mosko .............. G06F 17/3089 709/217 |
| 2016/0021172 A1 | 1/2016 | Mahadevan |
| 2016/0224799 A1* | 8/2016 | Uzun .............. G06F 21/6227 |
| 2016/0285671 A1* | 9/2016 | Rangarajan ........ H04L 67/327 |
| 2017/0308681 A1* | 10/2017 | Gould .............. G06F 21/10 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| EP | 2323346 | 5/2011 |
| EP | 2991254 A1 | 3/2016 |
| WO | 03005288 A2 | 1/2003 |
| WO | 03042254 A1 | 5/2003 |
| WO | 03048369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |
| WO | 2015084327 | 6/2015 |

OTHER PUBLICATIONS

Jun Kurihara et al, An Encryption-Based Access Control Framework for COntent-Centric Networking, IFIP Networking Conference, 2015.*

Marc Mosko et al, All-In-One Streams for Content Centric Networks, ICNS conference, 2015.*

Reaz Ahmed et al, Route: A Name based Routing Scheme for Information Centric Networks, IEEE (Year: 2013).*

Jun Kurihara et al, An Encryption-Based Access Control Framework for COntent-Centric Networking, IFIP Networking Conference (Year: 2015).*

(56) References Cited

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.

(56) References Cited

OTHER PUBLICATIONS

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

(56) References Cited

OTHER PUBLICATIONS

S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify. sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http:// www.parc.com/publication/2709/named-data-networking-ndn-project. html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/ www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.

(56) References Cited

OTHER PUBLICATIONS

Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* * figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
International Search Report and Written Opinion in counterpart International Application No. PCT/US2017/038185, dated Sep. 27, 2017, 12 pages.
Ahmed, et al., "αRoute: A Name Based Routing Scheme for Information Centric Networks," 2013 Proceedings IEEE INFOCOM, Apr. 2013, pp. 90-94.
Kurihara, et al., "An Encryption-Based Access Control Framework for Content-Centric Networking," 2015 IFIP Networking Conference, May 2015, pp. 1-9.
Mosko, et al., "Secure Fragmentation for Content Centric Networking," 2015 IEEE 12th International conference on Mobile AD HOC and Sensor Systems, Oct. 2015, 7 pages.
Tourani, et al., "Security, Privacy, and Access Control in Information-Centric Networking: A Survey," ariv.org, Cornell University Library, Mar. 2016, 35 pages.

\* cited by examiner

PERMUTATION-BASED CONTENT ENCRYPTION WITH MANIFESTS IN A CONTENT CENTRIC NETWORK

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/231,515, entitled "AGGREGATE SIGNING OF DATA IN CONTENT CENTRIC NETWORKING," by inventors Ersin Uzun, Marc E. Mosko, Michael F. Plass, and Glenn C. Scott, filed 31 Mar. 2014 (hereinafter "U.S. patent application Ser. No. 14/231,515");

the disclosures of which are herein incorporated by reference in their entirety.

BACKGROUND

Field

This disclosure is generally related to distribution of digital content. More specifically, this disclosure is related to a method and system for facilitating random access to a piece of content in a content centric network.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. CCN is an effective network architecture for delivering content.

A manifest is a CCN content object that can be used to encode a larger "original" content object by including pointers or links to other "member" or "children" content objects (e.g., leaves) that contain the data that make up the larger content object encoded by the manifest. Because a manifest is itself a content object, a manifest can include links or children pointers to data objects (e.g., leaf nodes) or other manifests (e.g., non-leaf nodes). In order to reassemble the original content object encoded by a manifest, a consumer or client computing device typically performs an in-order traversal of the manifest tree, by concatenating bytes from the leaf nodes to form the whole original content object. If the original content object is encrypted, the manifest can specify the decryption metadata (i.e., the keys) to be used for all member content objects to which the manifest points. The consumer must locate or obtain these decryption keys before reassembling the content object, which can involve decrypting each member content object in the manifest. However, decrypting each member content object in the manifest may involve computationally costly procedures and may also induce significant delays.

SUMMARY

One embodiment provides a system that facilitates encryption of manifest content based on permutation. During operation, the system partitions, by a computer system, a collection of data into a first set of content objects, wherein a content object of the first set is a chunk comprised of a plurality of bytes. The system performs a first permutation function on the first set of content objects to obtain a first set of permuted content objects. The system creates a manifest based on the permuted content objects, wherein a manifest is a content object which indicates a second set of content objects, wherein a respective content object of the second set is a data object or another manifest. The system encodes the first permutation function and the permuted content objects in the manifest, thereby facilitating an authorized entity that receives the manifest to reassemble the manifest contents based on the permutation function.

In some embodiments, the first permutation function is performed on one or more of: bytes comprising an ordered concatenation of the chunks of the first set; bytes comprising each chunk of the first set; and each chunk of the partitioned collection of data, wherein the bytes comprising a respective chunk are not permuted.

In some embodiments, the manifest indicates the second set of content objects based on a direct embedding of a respective content object or a child pointer to a respective content object.

In some embodiments, encoding the first permutation function in the manifest is based on an order of child pointers which correspond to each permuted content object of the first set, and encoding the permuted content objects in the manifest is based on a tree-like topology.

In some embodiments, the system performs a second permutation function on an order of child pointers which correspond to content objects indicated in the manifest. The system encodes the second permutation function in the manifest.

In some embodiments, the first permutation function is based on one or more of: shuffling the bytes comprising the first set of content objects; Lehmer codes; a symmetric block cipher; an encryption algorithm; and a form of permutation encoding.

In some embodiments, encoding the first permutation function in the manifest is based on one or more of: embedding in the manifest the first permutation function by including the first permutation function in decryption metadata associated with the manifest; including in the manifest a link to retrieve the first permutation function, wherein a successful retrieval of the first permutation function via the included link involves a verification of authentication information; and indicating a secure channel over which to retrieve the first permutation function.

DETAILED DESCRIPTION

Figure 1:
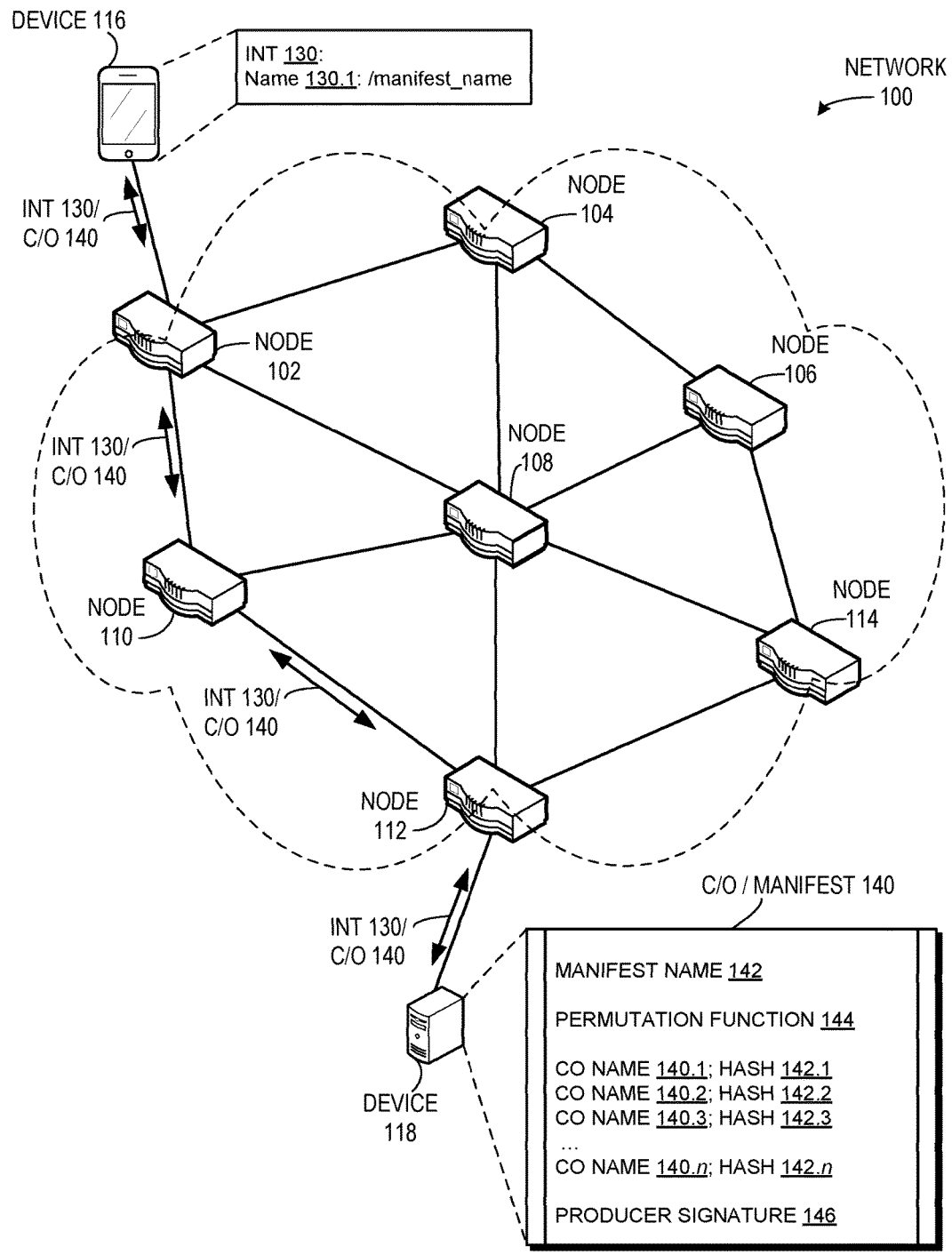
FIG. 1 illustrates an exemplary computing environment that facilitates encryption of manifest content based on permutation, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of costly decryption procedures for each individual content object of a manifest by performing a permutation-based encryption on the content of the manifest. In CCN, a large piece of content, e.g., a movie, video, book, or a genome sequence, can be represented as a manifest, which is a content object that describes a collection of content objects and may include their corresponding digests. A manifest can include a name and a signature, thus providing trust to a requesting application for the content objects described by the manifest. Signing and verifying aggregates of content objects through the use of a secure content catalog (e.g., a manifest) is described in U.S. patent application Ser. No. 14/231,515 which is herein incorporated by reference. The content described by the manifest can be data objects or other manifests. A manifest contains an inherent order based on a tree-like topology of the collection of objects described by the manifest. In order to retrieve or reassemble the contents of a manifest, a system can traverse a manifest tree, which contains child and parent nodes ordered in the tree-like structure.

Thus, a manifest is a CCN content object that can be used to encode a larger "original" content object by including pointers or links to other "member" or "children" content objects (e.g., leaves) that contain the data that make up the larger content object encoded by the manifest. Because a manifest is itself a content object, a manifest can include links or children pointers to data objects (e.g., leaf nodes) or other manifests (e.g., non-leaf nodes). For example, given a manifest with the name "/a/b" that includes a list of three pointers to content (or chunks) identified by the names "/a/b/chunk1," "/a/b/chunk2," and "/a/b/chunk3," the original content object encoded by the manifest is the concatenation of each of the three chunks, which are themselves content objects ("chunked content objects"). Reassembly of the content represented by the manifest is based on an in-order traversal of the manifest tree (e.g., by concatenating bytes from the leaf nodes to form the whole original content object). If the original content object is encrypted, the manifest can specify the decryption metadata (i.e., the keys) to be used for all children content objects to which the manifest points. The consumer must locate or obtain these decryption keys before reassembling the content object, which can involve decrypting each child content object in the manifest. However, decrypting each child content object in the manifest may involve computationally costly procedures and may also induce significant delays.

Embodiments of the present invention solve this problem by providing a technique to encrypt or hide the details of a content object by randomizing the reassembly strategy for a manifest. Some variations of the technique involve permuting the bytes of a leaf node (e.g., whole-content permutation, whole-chunk permutation, and chunk-level permutation), while other variations involve permuting the order of children nodes (or member content objects) visited during reassembly (e.g., traversal permutation). In addition, these variations may be combined to provide a hybrid permutation technique.

Specifically, given a collection of data or a large piece of content, a content producer can partition the collection of data into a set of content objects or chunks (or "chunked content objects"), and perform a permutation function on the set of chunked content objects. In "whole-content" permutation, a producer permutes all of the concatenated bytes of the chunked content objects. In "whole-chunk" permutation, the producer permutes the individual bytes that comprise each chunked content object. In "chunk-level" permutation, the producer permutes the entire set of chunked content objects, while leaving the bytes within each chunked content object intact. In "traversal" permutation, the producer permutes the ordered child pointers of a manifest. These various permutation techniques are described below in relation to FIGS. 2A-2G.

The producer can create a manifest based on the permuted content objects or chunks, and subsequently encode the permutation function and the permuted content objects in the manifest. In other words, the producer can build a manifest tree based on the permuted content objects, and further encode the permutation function in the manifest, as described further below.

A content consumer that receives the manifest can obtain or extract the permutation function, as described below in relation to FIG. 4, and use the permutation function to reassemble the original collection of data, without performing any additional computation. Thus, embodiments of the present invention allow a producer to permute content indicated by a manifest, and indicate the permutation function in the manifest. This allows a consumer that receives the manifest to perform a secure reassembly, which results in reduced time and a more efficient distribution of digital data.

Thus, these results provide improvements to the distribution of digital content, where the improvements are fundamentally technological. Embodiments of the present invention provide a technological solution (e.g., transmitting large amounts of digital data via permutation-based content encryption of a manifest) to the technological problem of the efficient, secure, and effective distribution of digital content.

In examples described in this disclosure, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms are used to describe the CCN architecture:

Content Object (or "Content Object"):

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "Interest"):

A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175 which is herein incorporated by reference.

Network Architecture and Overview of Order Encoded Manifest

FIG. 1 illustrates an exemplary computing environment that facilitates encryption of manifest content based on permutation, in accordance with an embodiment of the present invention. Network 100 can include a content requesting device 116, a content producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). During operation, client computing device 116 can generate and send an interest 130 with a name 130.1 of "/manifest_name," which also indicates a collection of data. Interest 130 can travel through a network (such as a CCN) via nodes or routers 102, 110, and 112, finally reaching content producing device or producer 118. Producer 118 can generate and transmit a responsive content object, which can be a manifest 140 with a manifest name 142 (that has a value of, e.g., "/manifest_name"), a permutation function 144, a list of content objects by names 140.1-140.$n$ and corresponding content object hashes or digests 142.1-142.$n$, and a producer signature 146. Manifest 140 can travel back to device 116 via a reverse path (e.g., routers 112, 110, and 102).

Device 116 can receive manifest 140 and obtain permutation function 144. Permutation function 144 may be embedded directly in manifest 140, indicated as a link, or indicated via a secure channel. Device 116 may perform a retrieval procedure that involves a cryptographic operation (such as requesting the permutation function information based on a public key, asymmetric key, digital certificate, or other method). Once in possession of the permutation function, device 116 can retrieve the permuted content objects of manifest 140, and reassemble the retrieved permuted content objects by using the obtained permutation function. In this way, device 116 can avoid having to perform additional computation, e.g., a costly computation procedure associated with each individually retrieved content object. Instead, device 116 need only reassemble or rearrange the retrieved content objects based on the permutation function. The only cryptographic operation performed by device 116 may be retrieving the permutation function, depending on how the permutation function is indicated in the manifest.

Exemplary Manifest Tree

Figure 2A:
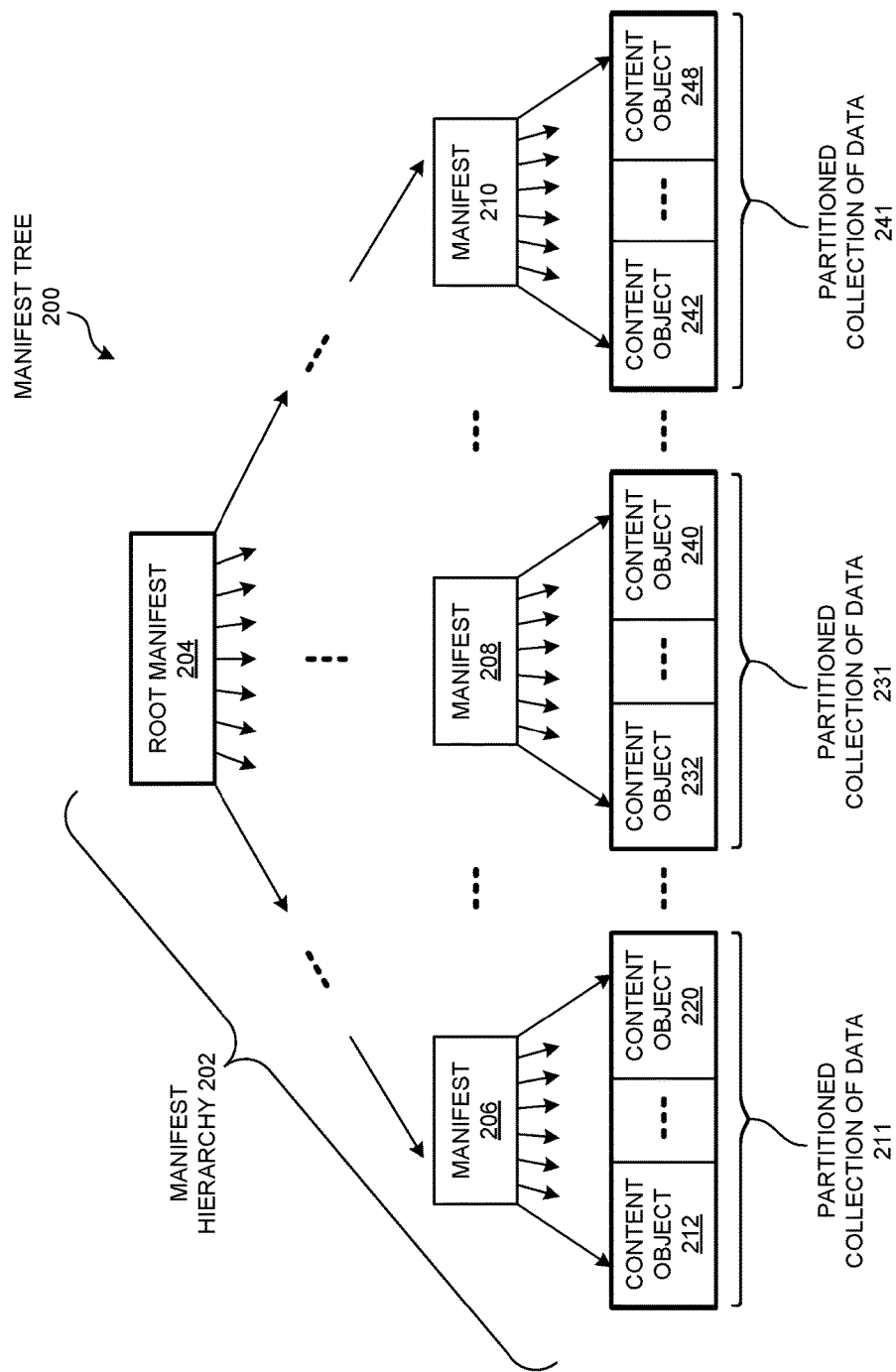
FIG. 2A presents an exemplary manifest tree illustrating partitioned collections of data, in accordance with an embodiment of the present invention.

FIG. 2A presents an exemplary manifest tree 200 illustrating partitioned collections of data, in accordance with an embodiment of the present invention. Manifest tree 200 can represent a large collection of data, which can be a single large content object, and can be represented by a manifest hierarchy 202. Specifically, a content producer can partition a data collection into n content objects 212-248, and can create a manifest hierarchy 202 for the partitioned collection. Manifest hierarchy 202 can include one or more levels of manifests, such that higher-level manifests (e.g., root manifest 204) reference a next-level manifest (e.g., manifests 206, 208, and 210) via its name or self-certifying name. Manifests with self-certifying names are described, respectively, in U.S. application Ser. No. 14/231,515. The content producer can create a set of p manifests for the n content objects 212-248. While manifest hierarchy 202 depicts a complete tree, in practice, manifest hierarchy can include any tree structure that maintains an in-order traversal order.

The individual manifests in manifest hierarchy 202 may each include an arbitrary number of links or pointers to children or member content objects. For example, manifest 206 can include links to content objects 212-220 (which comprise a partitioned collection of data 211), manifest 208 can include links to content objects 232-240 (which comprise a partitioned collection of data 231), and manifest 210 can include links to content objects 242-248 (which comprise a partitioned collection of data 241). Just as root manifest 204 is a content object that represents a large collection of data, so is manifest 206 a content object that represents a (partitioned) collection of data.

Whole-Content Permutation

Assume the following notations: let "CO" be a content object of size "|CO|" in bytes and size "||CO||" in chunks; let "$CO_i$" be the i-th chunk of a content object of size "$|CO_i|$" in bytes; let M be a manifest with "|M|" entries; let "$M_i$" be the i-th entry in a manifest; and let "p(i,j)" be the permutation of the integers from i to j (i<j), inclusive.

Figure 2B:
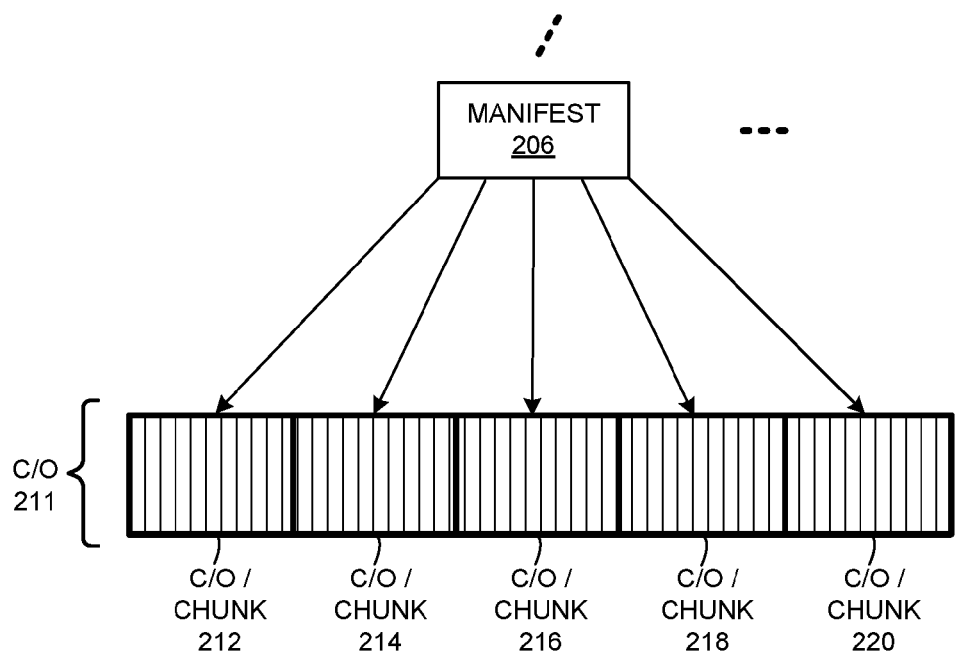
FIG. 2B presents an exemplary manifest with child content object chunks, including a whole-content permutation function performed on the concatenated bytes of a partitioned collection of data, in accordance with an embodiment of the present invention.

FIG. 2B presents an exemplary manifest 206 with child content object chunks, including a whole-content permutation function performed on the concatenated bytes of a partitioned collection of data, in accordance with an embodiment of the present invention. Content object 211 corresponds to partitioned collection of data 211 of FIG. 2A and includes a set of content objects or chunks 212, 214, 216, 218, and 220. In some embodiments, chunks 212-220 can each include the same number of bytes.

In whole-content permutation, a producer can perform a permutation function on all of the concatenated bytes of a large content object before encoding it with a manifest. The producer can generate a permutation p(1, |CO|), and shuffle the bytes of CO based on this permutation, forming the encrypted version, CO'. The producer can then create a manifest tree by chunking the encrypted bytes CO'. For example, the producer can generate a permutation p(i, |CO|), where |CO| is the total size in bytes of content object 211, which results in rearranging the bytes comprising the concatenation of chunks 212-220. The producer can subsequently build manifest 206 based on the permuted bytes of content object 211. Because the permutation applies to the entire content object 211, the permutation function p is stored in the root manifest (i.e., manifest 206) that represents the content object.

Whole-Chunk Permutation

Figure 2C:
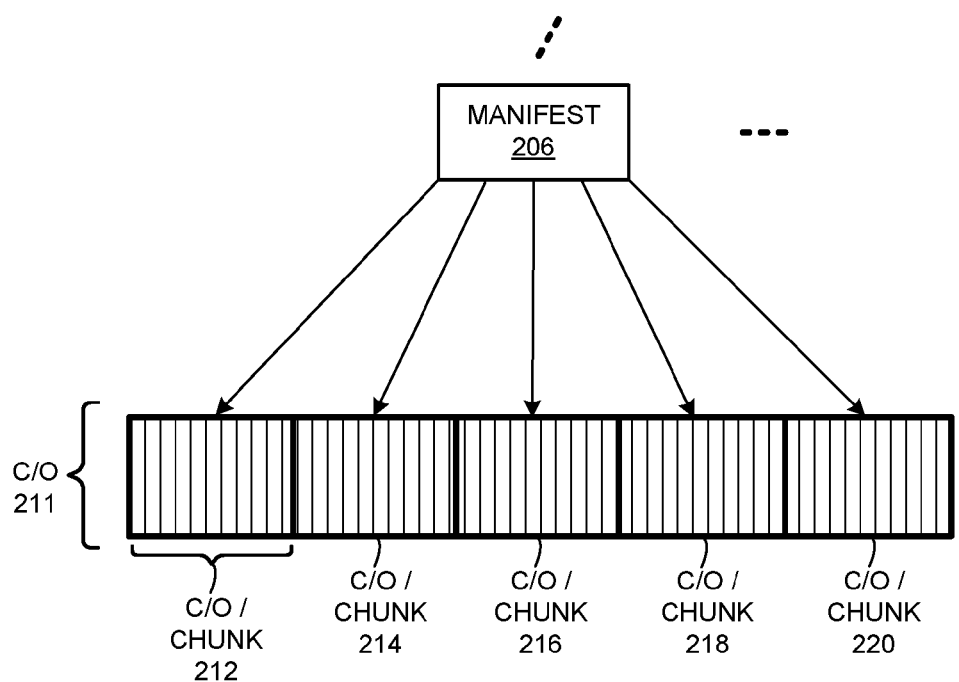
FIG. 2C presents an exemplary manifest with child content object chunks, including a whole-chunk permutation function performed on the bytes of each chunk of a partitioned collection of data, in accordance with an embodiment of the present invention.

FIG. 2C presents an exemplary manifest 206 with child content object chunks, including a whole-chunk permutation function performed on the bytes of each chunk of a partitioned collection of data, in accordance with an embodiment of the present invention. In whole-chunk permutation, a producer can perform a permutation function on the bytes of each content object chunk $CO_i$ before encoding it with a manifest. The producer can generate a permutation p(1, $|CO_i|$), shuffle the bytes of each $CO_i$ in the same way, and create a manifest tree based on the permuted chunks. For example, the producer can generate a permutation p(1, $|CO_i|$), where $|CO_i|$ is the total size in bytes of each content object chunk (e.g., chunk 212), which results in rearranging the bytes comprising each individual content object chunk. The producer can then build manifest 206 based on the permuted chunks of content object 211. Because the permutation applies to the entire content object 211 by touching each chunk, the permutation function p is stored in the root manifest (i.e., manifest 206) that represents the content object.

Chunk-Level Permutation

Figure 2D:
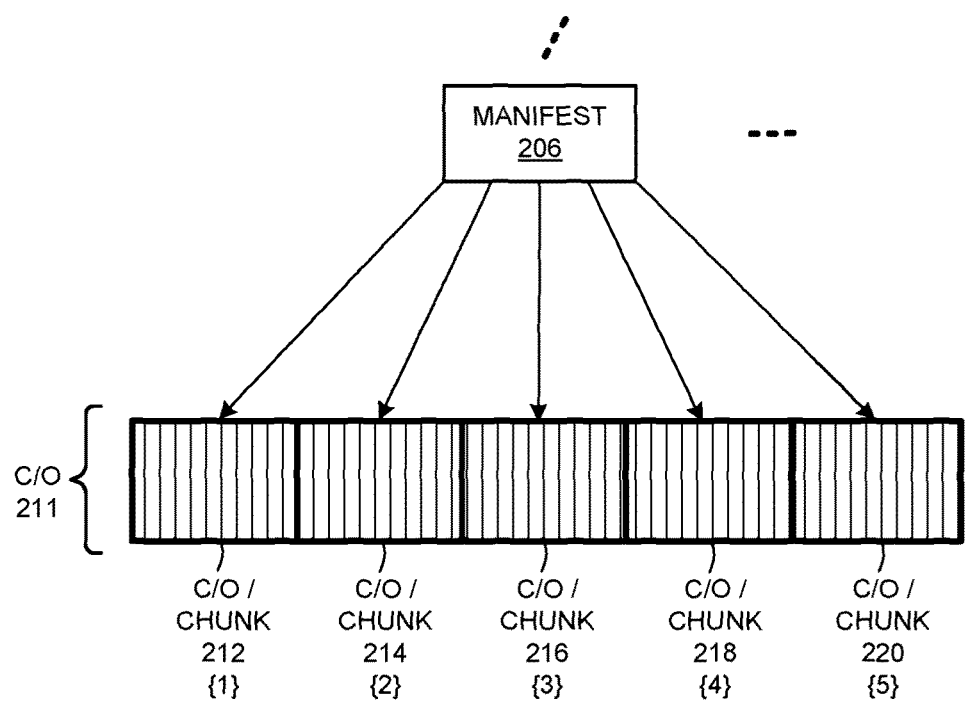
FIG. 2D presents an exemplary manifest with child content object chunks, which illustrates the numbered chunks of a partitioned collection of data before a chunk-level permutation function is performed on the numbered chunks, in accordance with an embodiment of the present invention.

FIG. 2D presents an exemplary manifest 206 with child content object chunks, which illustrates the numbered chunks of a partitioned collection of data before a chunk-level permutation function is performed on the numbered chunks, in accordance with an embodiment of the present invention. In chunk-level permutation, a producer can perform a permutation function on the individual chunks of the content object. The producer can generate a permutation p(1,||CO||), shuffle the content object chunks, and create a manifest tree based on the permuted chunks. This technique leaves the bytes within each chunk intact. For example, the producer can generate a permutation p(1,||CO||), where ||CO|| is the total size in chunks of content object 211, which results in rearranging the chunks comprising content object 211. The producer can then build manifest 206 based on the shuffled chunks of content object 211, as shown in FIG. 2E.

Figure 2E:
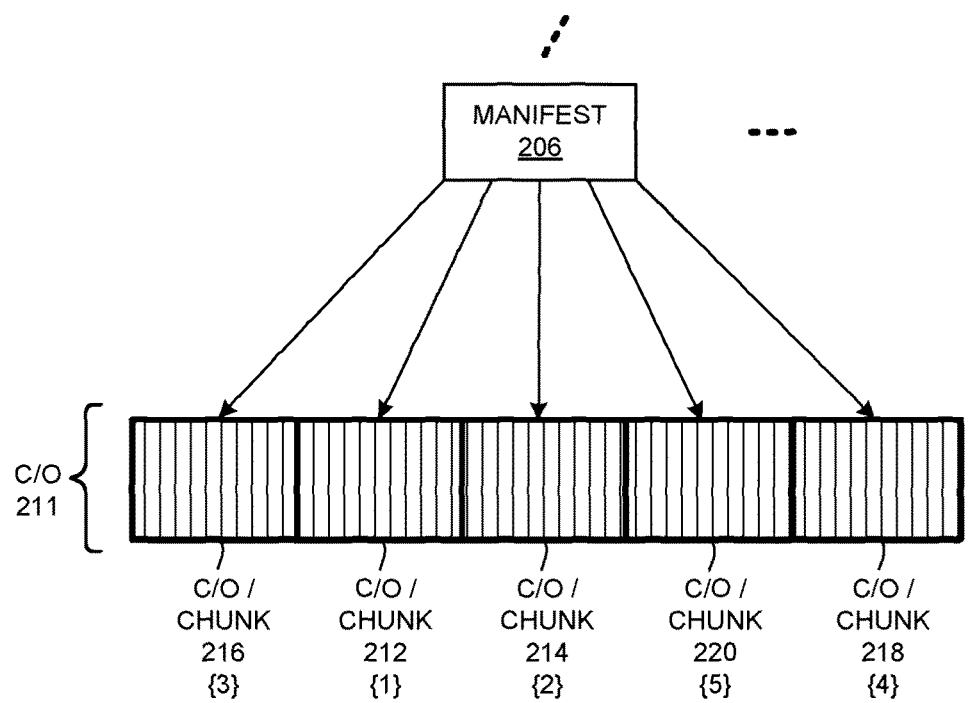
FIG. 2E presents an exemplary manifest with child content object chunks corresponding to FIG. 2D, including a chunk-level permutation function performed on the numbered chunks, in accordance with an embodiment of the present invention.

FIG. 2E presents an exemplary manifest with child content object chunks corresponding to FIG. 2D, including a chunk-level permutation function performed on the numbered chunks, in accordance with an embodiment of the present invention. For a set of content object chunks ordered {1, 2, 3, 4, 5}, the producer can perform a chunk-level permutation, as described above in relation to FIG. 2D, which shuffles the chunks of content object 211 to result in a set of content object chunks ordered {3, 1, 2, 5, 4}. Because the permutation applies to the entire content object 211 by shuffling every chunk, the permutation function p is stored in the root manifest (i.e., manifest 206) that represents the content object.

Traversal Permutation

Figure 2F:
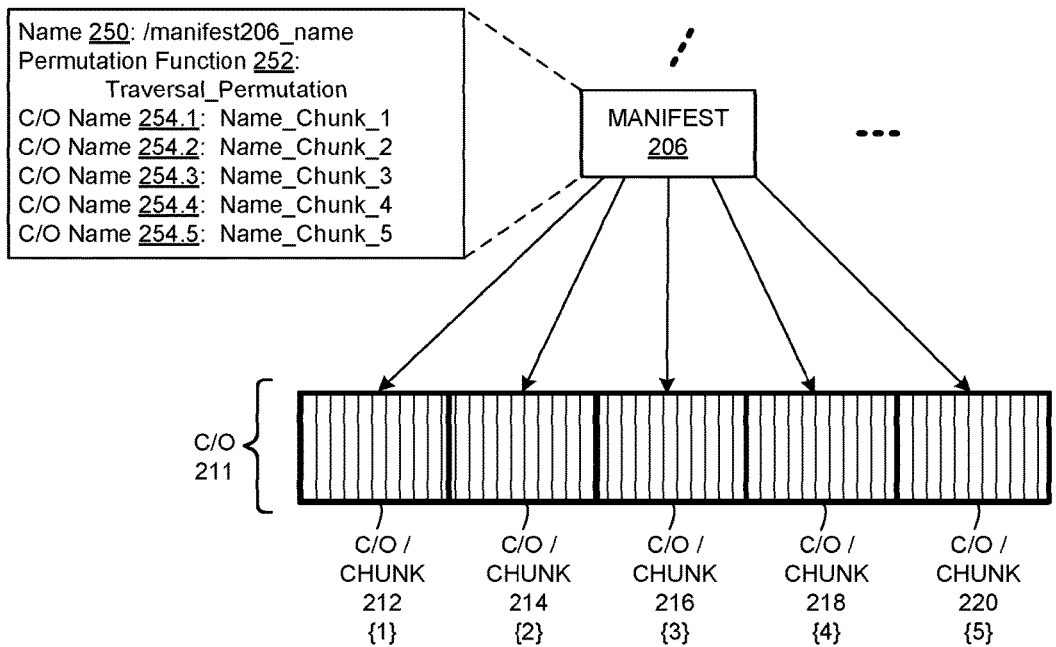
FIG. 2F presents an exemplary manifest with child content object chunks, which illustrates the numbered chunks of a partitioned collection of data before a traversal permutation function is performed on the numbered chunks, in accordance with an embodiment of the present invention.

FIG. 2F presents an exemplary manifest 206 with child content object chunks, which illustrates the numbered chunks of a partitioned collection of data before a traversal permutation function is performed on the numbered chunks, in accordance with an embodiment of the present invention. In traversal permutation, a producer can perform a permutation function on the ordered of pointers to child content object in a manifest. Given a manifest M, the producer can generate a permutation p(1,|M|) and shuffle or permute the order of the child pointers. Let manifest M be manifest 206, which includes a name 250 of "/manifest206_name," a permutation function 252 with a value of "Traversal_Permutation," and a list of pointers to content objects based on content object names 254.1-254.5 (e.g., "Name_Chunk_1," "Name_Chunk_2," etc.). The producer can generate a permutation p(i,|M|), where |M| is the number of entries in M and is equal to 5, which results in rearranging the ordered list of entries in M, as shown below in FIG. 2G.

Figure 2G:
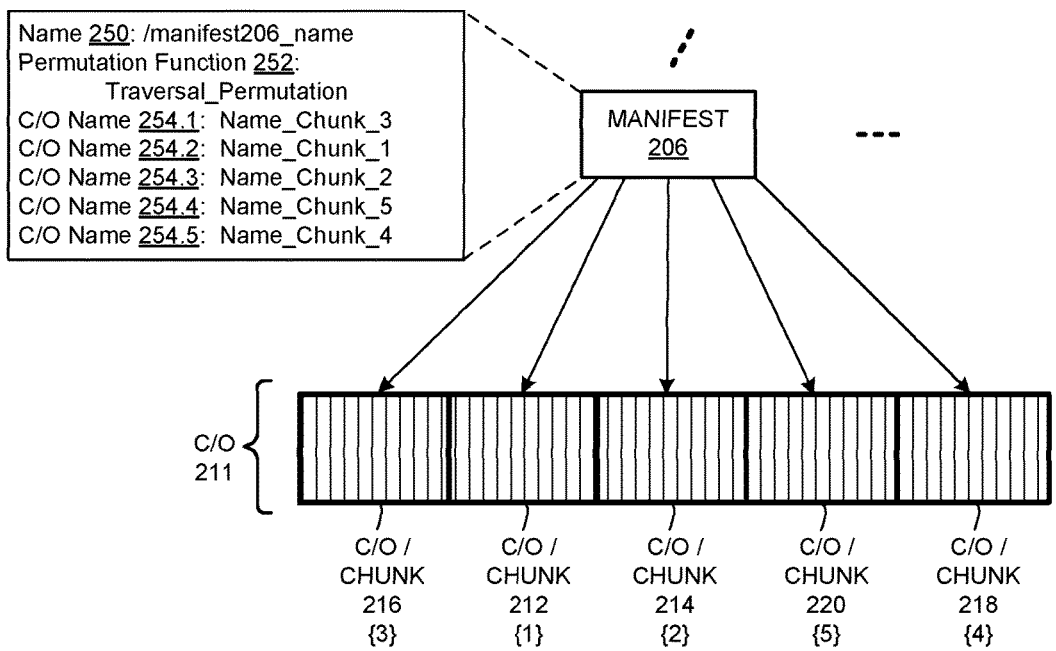
FIG. 2G presents an exemplary manifest with child content object chunks corresponding to FIG. 2F, including a traversal level permutation function performed on the numbered chunks as listed child pointers in the parent manifest, in accordance with an embodiment of the present invention.

FIG. 2G presents an exemplary manifest with child content object chunks corresponding to FIG. 2F, including a traversal level permutation function performed on the numbered chunks as listed child pointers in the parent manifest, in accordance with an embodiment of the present invention. Manifest 206 can include a name 250 of "/manifest206_name", a permutation function 252 with a value of "Traversal_Permutation," and a list of shuffled pointers to content objects based on content object names 254.1-254.5. That is, the child pointers in manifest 206 are shuffled from an order of {1, 2, 3, 4, 5} to an order of {3, 1, 2, 5, 4}, where the new shuffled order corresponds to "Name_Chunk_3," "Name_Chunk_1," "Name_Chunk_2," "Name_Chunk_5," and "Name_Chunk_4." Because the permutation applies to only a subset of the content object represented by either a root manifest or a child (non-leaf) manifest (such as manifest 206), the permutation function p is stored in the manifest to which the permutation is applied (i.e., manifest 206).

Note that chunk-level permutation and traversal permutation are associated in that both chunk-level permutation (on the chunks of the larger content object) and traversal permutation (on the ordered child pointers of a manifest) result in a manifest with shuffled pointers to chunks.

Content Producer Encrypts Manifest Content Based on Permutation

Figure 3A:
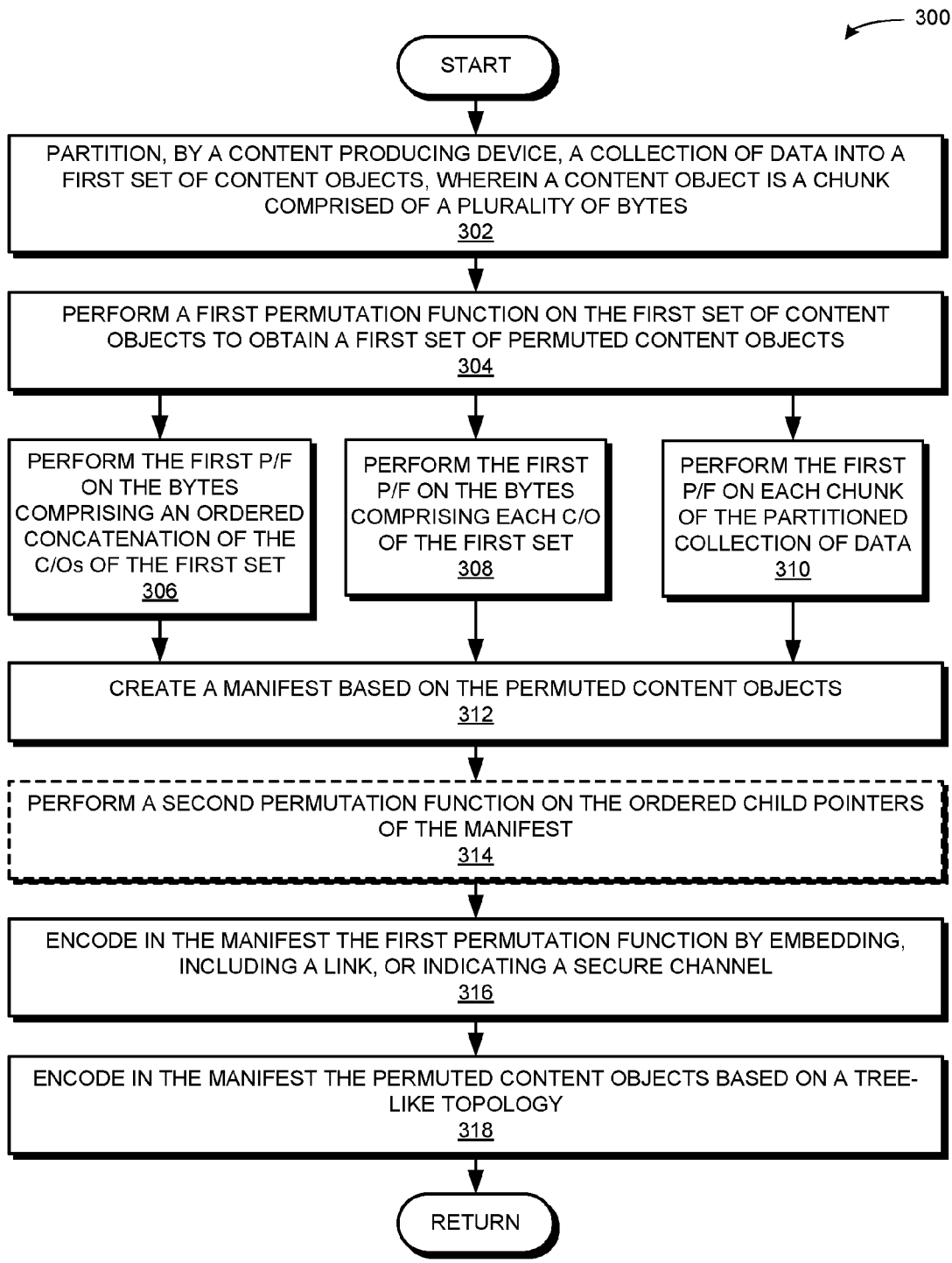
FIG. 3A presents a flow chart illustrating a method performed by a content producing device for encrypting manifest content based on permutation, in accordance with an embodiment of the present invention.

FIG. 3A presents a flow chart 300 illustrating a method performed by a content producing device for encrypting manifest content based on permutation, in accordance with an embodiment of the present invention. During operation, the system partitions, by a content producing device, a collection of data into a first set of content objects, wherein a content object is a chunk comprised of a plurality of bits (operation 302). In some embodiments, each chunk is of a fixed size. The system performs a first permutation function on the first set of content object to obtain a first set of permuted content objects (operation 304). The first permutation function can be a whole-content permutation, a whole-chunk permutation, or a chunk-level permutation, or a hybrid of these permutations, as described above. For example, the system can perform the first permutation function on the bytes comprising an ordered concatenation of the content objects of the first set (whole-content permutation) (operation 306). The system can also or alternatively perform the first permutation function on the bytes comprising each content object of the first set (whole-chunk permutation) (operation 308). The system can also or alternatively perform the first permutation function on each chunk of the partitioned collection of data (chunk-level permutation) (operation 310). Note that the bytes comprising each individual chunk remain unchanged in the chunk-level permutation.

The system creates a manifest based on the permuted content objects (operation 312). Recall that a manifest is itself a content object which indicates a set of content objects which are data objects or other manifests. A manifest can also indicate the set of content objects in a particular order, e.g., as pointers based on a tree-like topology of the data represented by the manifest. In some embodiments, the system performs a second permutation function on the ordered child pointers of the manifest (traversal permutation) (operation 314). Traversal permutation can occur as a result of or in advance of chunk-level permutation. The system encodes in the manifest the first permutation function by embedding, including a link, or indicating a secure channel (operation 316). The system also encodes in the manifest the permuted content objects based on a tree-like topology (operation 318), as described above in relation to FIG. 2A.

Figure 3B:
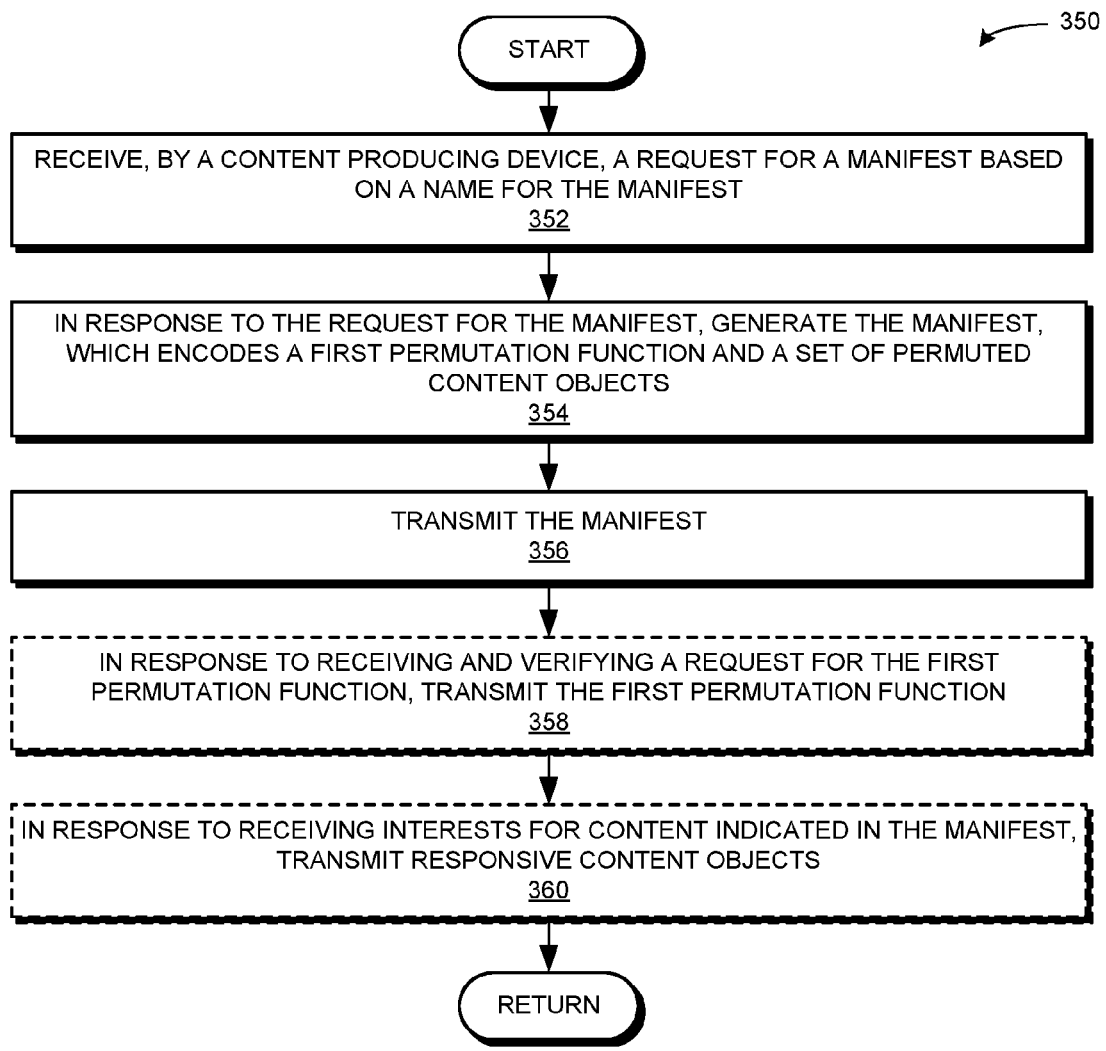
FIG. 3B presents a flow chart illustrating a method performed by a content producing device for encrypting manifest content based on permutation, in accordance with an embodiment of the present invention.

FIG. 3B presents a flow chart 350 illustrating a method performed by a content producing device for encrypting manifest content based on permutation, in accordance with an embodiment of the present invention. During operation, the system receives, by a content producing device, a request for a manifest based on a name for the manifest (operation 352). In response to the request for the manifest, the system generates the manifest, which encodes a first permutation function and a set of permuted content objects (operation 354). The system transmits the manifest (operation 356). In some embodiments, in response to receiving and verifying a request for the first permutation function, the system transmits the first permutation function (operation 358). Specifically, the request and response can be for information which indicates the first permutation function. In response to receiving interests for content indicated in the manifest, the system can transmit the responsive content objects (operation 360). Note that the manifest can point to both content that can be satisfied by the content producing device as well as content that cannot be satisfied by the content producing device (i.e., content owned or published by another entity). There are no restrictions on the location of the content indicated in the manifest.

Content Consumer Processes Encrypted Manifest Based on Permutation

Figure 4:
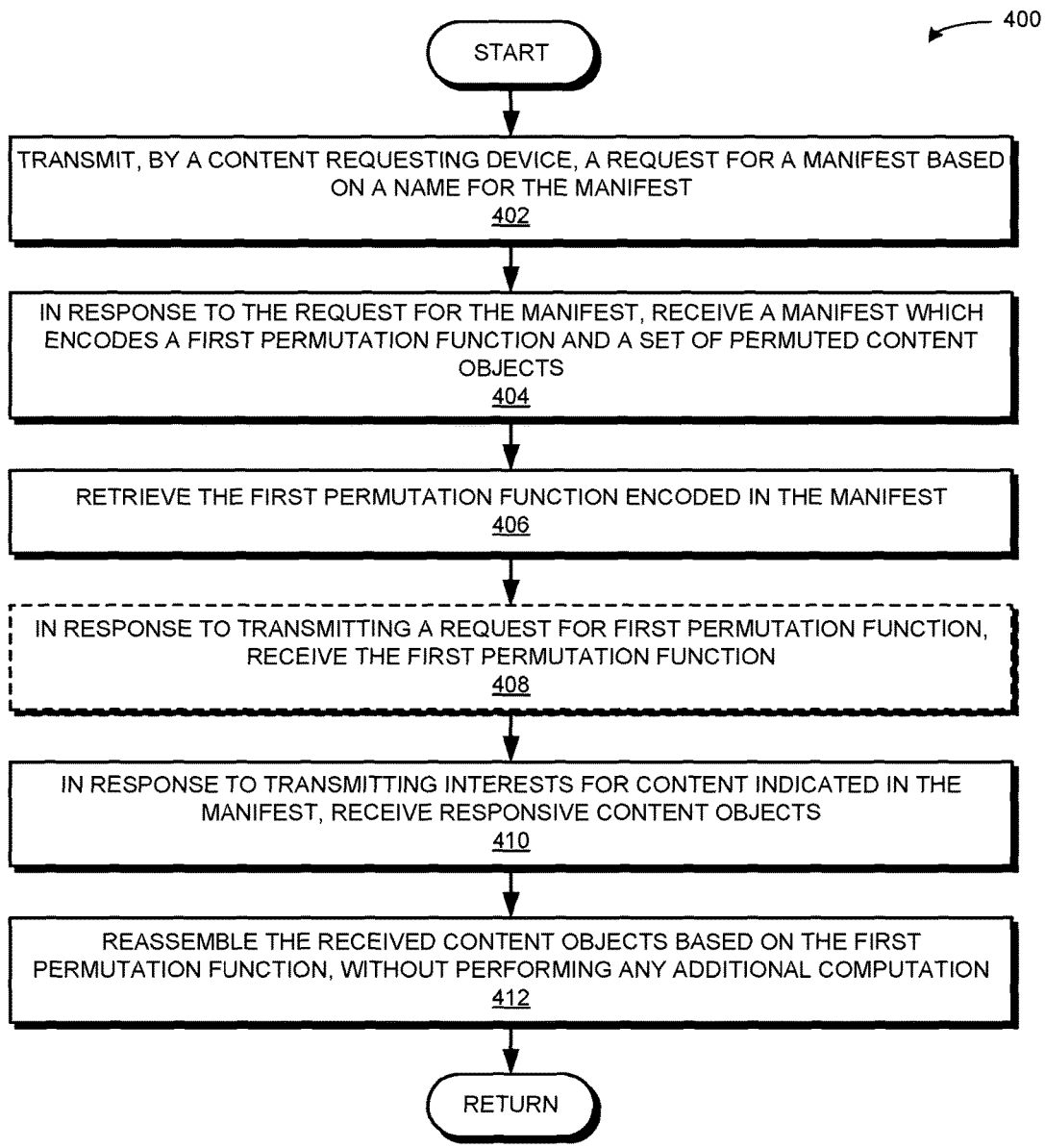
FIG. 4 presents a flow chart illustrating a method performed by a content requesting device for processing encrypted content of a manifest based on permutation, in accordance with an embodiment of the present invention.

FIG. 4 presents a flow chart 400 illustrating a method performed by a content requesting device for processing encrypted content of a manifest based on permutation, in accordance with an embodiment of the present invention. During operation, the system transmits, by a content requesting device, a request for a manifest based on a name for the manifest (operation 402). In response to the request for the manifest, the system receives a manifest which encodes a first permutation function and a set of permuted content objects (operation 404). The system retrieves the first permutation function encoded in the manifest (operation 406). Recall that the first permutation function can be directly embedded, linked, or indicated as retrieveable over a secure channel. Thus, in some embodiments, in response to transmitting a request for the first permutation function, the system receives the first permutation function (operation 408).

In response to transmitting interests for the content indicated in the manifest, the system receives responsive content objects (operation 410). The system reassembles the received content object based on the first permutation function, without performing any additional computation (operation 412).

Exemplary Computer and Communication System

Figure 5:
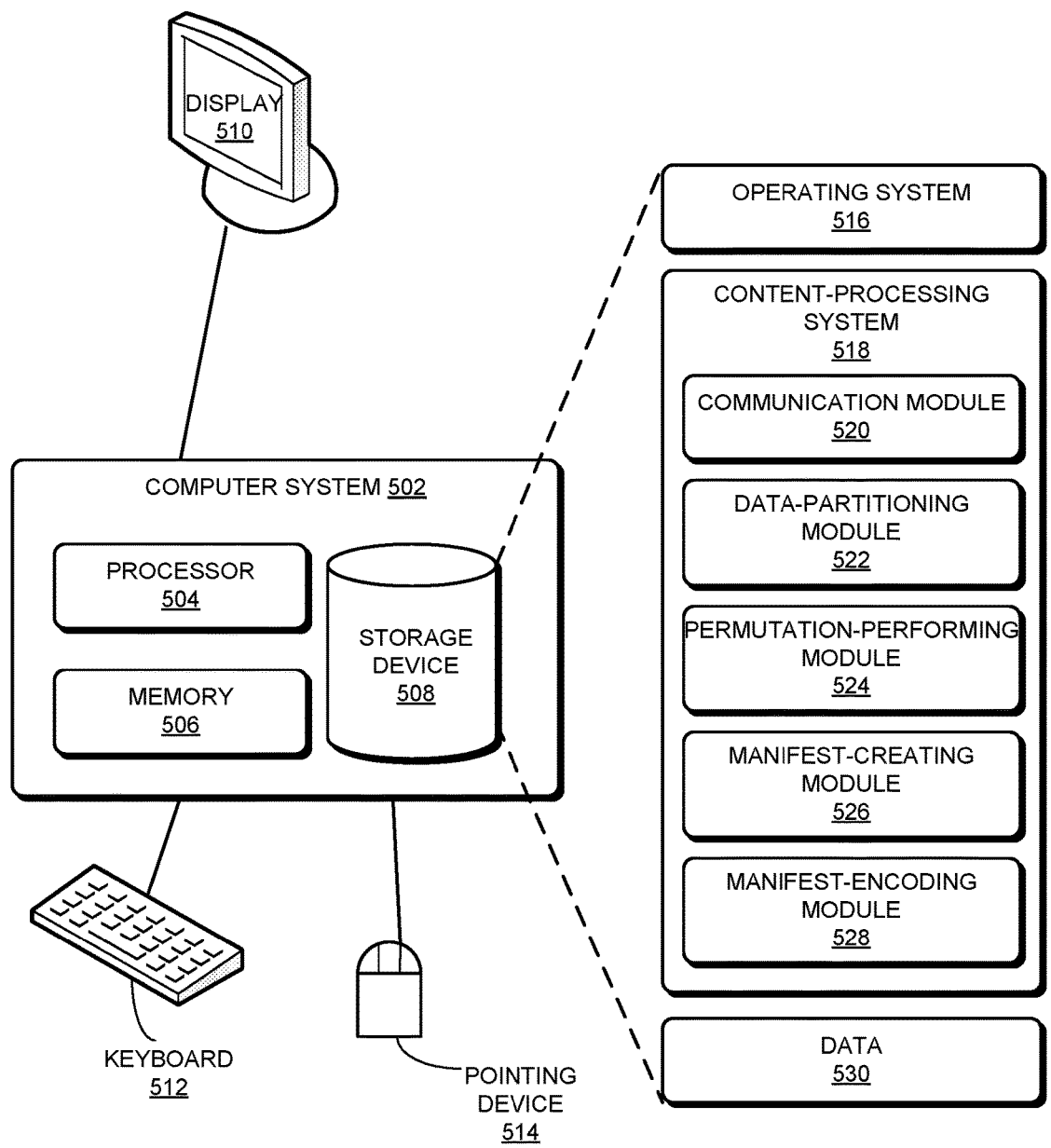
FIG. 5 illustrates an exemplary computer and communication system that facilitates encryption of manifest content based on permutation, in accordance with an embodiment of the present invention In the figures, like reference numerals refer to the same figure elements.

FIG. 5 illustrates an exemplary computer and communication system that facilitates encryption of manifest content based on permutation, in accordance with an embodiment of the present invention. Computer and communication system 502 includes a processor 504, a memory 506, and a storage device 508. Memory 506 can include a volatile memory (e.g., RAM) that serves as a managed memory, and can be used to store one or more memory pools. Furthermore, computer and communication system 502 can be coupled to a display device 510, a keyboard 512, and a pointing device 514. Storage device 508 can store an operating system 516, a content-processing system 518, and data 530.

Content-processing system 518 can include instructions, which when executed by computer and communication system 502, can cause computer and communication system 502 to perform methods and/or processes described in this disclosure. Specifically, content-processing system 518 may include instructions for partitioning, by a computer system, a collection of data into a first set of content objects, wherein a content object of the first set is a chunk comprised of a plurality of bytes (data-partitioning module 522). Content-processing system 518 can include instructions for performing a first permutation function on the first set of content objects to obtain a first set of permuted content objects (permutation-performing module 524). Content-processing system 518 can also include instructions for creating a manifest based on the permuted content objects, wherein a manifest is a content object which indicates a second set of content objects, wherein a respective content object of the second set is a data object or another manifest (manifest-creating module 526). Content-processing system 518 can include instructions for encoding the first permutation function and the permuted content objects in the manifest (manifest-encoding module).

Content-processing system 518 can further include instructions for performing a second permutation function on an order of child pointers which correspond to content objects indicated in the manifest (permutation-performing module 524). Content-processing system 518 can include instructions for encoding the second permutation function in the manifest (manifest-encoding module 528).

Data 530 can include any data that is required as input or that is generated as output by the methods and/or processes described in this disclosure. Specifically, data 530 can store at least: a collection of data; a content object; a partitioned collection of data that is a content object; a name; a manifest; a manifest or root manifest that indicates a set of content objects and/or their corresponding digests; a data object; a name associated with each content object; a name that is a hierarchically structured variable length identifier which comprises contiguous name components ordered from a most general level to a most specific level; a permutation function; a set of permuted content objects or chunks; a manifest that encodes a permutation function and a set of permuted content objects or chunks; ordered and permuted bytes comprising an ordered concatenation of chunked content objects; ordered and permuted bytes comprising an chunked content object; ordered and permuted chunks of a content object; ordered and permuted list of pointers to content objects; Lehmer codes; a symmetric block cipher; an encryption algorithm; a form of permutation encoding; and information indicating a permutation function.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for encoding content, comprising:
   receiving, by a computer system, a request for a manifest from an authorized entity;
   partitioning, by the computer system, a collection of data into a first set of content objects, wherein a content object of the first set of content objects is a chunk comprised of a plurality of bytes;
   performing, by the computer system, a first permutation function on the first set of content objects to obtain a first set of permuted content objects;
   creating, by the computer system, the manifest based on the permuted content objects, wherein the manifest is a content object which indicates a second set of content objects, wherein a respective content object of the second set is a data object or another manifest;
   performing, by the computer system, a second permutation function on an order of child pointers which correspond to content objects indicated in the manifest;
   encoding, by the computer system, the first permutation function, the second permutation function, and the permuted content objects in the manifest, thereby facilitating the authorized entity that receives the manifest to reassemble the manifest contents based on a permutation function, wherein encoding the first permutation function in the manifest includes indicating a secure channel over which to retrieve the first permutation function; and
   providing, by the computer system, the manifest to the authorized entity.

2. The method of claim 1, wherein the first permutation function is performed on one or more of:
   bytes comprising an ordered concatenation of the chunks of the first set of content objects;
   bytes comprising each chunk of the first set of content objects; and
   each chunk of the partitioned collection of data, wherein the bytes comprising a respective chunk are not permuted.

3. The method of claim 1, wherein the manifest indicates the second set of content objects based on a direct embedding of a respective content object or a child pointer to a respective content object.

4. The method of claim 1, wherein encoding the first permutation function in the manifest is based on an order of child pointers which correspond to each permuted content object of the first set of permuted content objects, and wherein encoding the permuted content objects in the manifest is based on a tree-like topology.

5. The method of claim 1, wherein the first permutation function is based on one or more of:
shuffling the bytes comprising the first set of content objects;
Lehmer codes;
a symmetric block cipher;
an encryption algorithm; and
a form of permutation encoding.

6. The method of claim 1, wherein encoding the first permutation function in the manifest is based on one or more of:
embedding in the manifest the first permutation function by including the first permutation function in decryption metadata associated with the manifest; and
including in the manifest a link to retrieve the first permutation function, wherein a successful retrieval of the first permutation function via the link involves a verification of authentication information.

7. The method of claim 1, further comprising:
receiving, by the computer system, a request for the first permutation function from the authorized entity; and
in response to the request for the first permutation function, providing the first permutation function to the authorized entity.

8. A non-transitory computer-readable storage medium storing instructions that when executed by a computer cause the computer to perform a method, the method comprising:
receiving, by a computer system, a request for a manifest from an authorized entity;
partitioning, by the computer system, a collection of data into a first set of content objects, wherein a content object of the first set of content objects is a chunk comprised of a plurality of bytes;
performing, by the computer system, a first permutation function on the first set of content objects to obtain a first set of permuted content objects;
creating, by the computer system, the manifest based on the permuted content objects, wherein the manifest is a content object which indicates a second set of content objects, wherein a respective content object of the second set is a data object or another manifest;
performing, by the computer system, a second permutation function on an order of child pointers which correspond to content objects indicated in the manifest;
encoding, by the computer system, the first permutation function, the second permutation function, and the permuted content objects in the manifest, thereby facilitating the authorized entity that receives the manifest to reassemble the manifest contents based on a permutation function, wherein encoding the first permutation function in the manifest includes indicating a secure channel over which to retrieve the first permutation function; and
providing, by the computer system, the manifest to the authorized entity.

9. The storage medium of claim 8, wherein the first permutation function is performed on one or more of:
bytes comprising an ordered concatenation of the chunks of the first set of content objects;
bytes comprising each chunk of the first set of content objects; and
each chunk of the partitioned collection of data, wherein the bytes comprising a respective chunk are not permuted.

10. The storage medium of claim 8, wherein the manifest indicates the second set of content objects based on a direct embedding of a respective content object or a child pointer to a respective content object.

11. The storage medium of claim 8, wherein encoding the first permutation function in the manifest is based on an order of child pointers which correspond to each permuted content object of the first set of permuted content objects, and wherein encoding the permuted content objects in the manifest is based on a tree-like topology.

12. The storage medium of claim 8, wherein encoding the first permutation function in the manifest is based on one or more of:
embedding in the manifest the first permutation function by including the first permutation function in decryption metadata associated with the manifest; and
including in the manifest a link to retrieve the first permutation function, wherein a successful retrieval of the first permutation function via the link involves a verification of authentication information.

13. The storage medium of claim 8, wherein the first permutation function is based on one or more of:
shuffling the bytes comprising the first set of content objects;
Lehmer codes;
a symmetric block cipher;
an encryption algorithm; and
a form of permutation encoding.

14. A computer system for encoding content, the system comprising:
a processor;
a storage device coupled to the processor and storing instructions that when executed by a computer cause the computer to perform a method, the method comprising:
receiving, by a computer system, a request for a manifest from an authorized entity;
partitioning, by the computer system, a collection of data into a first set of content objects, wherein a content object of the first set of content objects is a chunk comprised of a plurality of bytes;
performing, by a computer system, a first permutation function on the first set of content objects to obtain a first set of permuted content objects;
creating, by a computer system, the manifest based on the permuted content objects, wherein the manifest is a content object which indicates a second set of content objects, wherein a respective content object of the second set is a data object or another manifest;
performing, by a computer system, a second permutation function on an order of child pointers which correspond to content objects indicated in the manifest;
encoding, by a computer system, the first permutation function, the second permutation function, and the permuted content objects in the manifest, thereby facilitating the authorized entity that receives the manifest to reassemble the manifest contents based on a permutation function, wherein encoding the first permutation function in the manifest includes indicating a secure channel over which to retrieve the first permutation function; and
providing, by the computer system, the manifest to the authorized entity.

15. The computer system of claim 14, wherein the first permutation function is performed on one or more of:
- bytes comprising an ordered concatenation of the chunks of the first set of content objects;
- bytes comprising each chunk of the first set of content objects; and
- each chunk of the partitioned collection of data, wherein the bytes comprising a respective chunk are not permuted.

16. The computer system of claim 14, wherein the manifest indicates the second set of content objects based on a direct embedding of a respective content object or a child pointer to a respective content object.

17. The computer system of claim 14, wherein encoding the first permutation function in the manifest is based on an order of child pointers which correspond to each permuted content object of the first set of permuted content objects, and wherein encoding the permuted content objects in the manifest is based on a tree-like topology.

18. The computer system of claim 14, wherein the first permutation function is based on one or more of:
- shuffling the bytes comprising the first set of content objects;
- Lehmer codes;
- a symmetric block cipher;
- an encryption algorithm; and
- a form of permutation encoding.

19. The computer system of claim 14, wherein encoding the first permutation function in the manifest is based on one or more of:
- embedding in the manifest the first permutation function by including the first permutation function in decryption metadata associated with the manifest; and
- including in the manifest a link to retrieve the first permutation function, wherein a successful retrieval of the first permutation function via the link involves a verification of authentication information.

20. The storage medium of claim 8, the method further comprising:
- receiving, by the computer system, a request for the first permutation function from the authorized entity; and
- in response to the request for the first permutation function, providing the first permutation function to the authorized entity.

* * * * *